United States Patent
Suess et al.

(10) Patent No.: US 6,870,500 B2
(45) Date of Patent: Mar. 22, 2005

(54) SIDE LOOKING SAR SYSTEM

(75) Inventors: Martin Suess, Leiden (NL); Werner Wiesbeck, Keltern-Ellmendingen (DE)

(73) Assignee: EADS Astrium GmbH, Munich (DE)

( * ) Notice: Subject to any disclaimer, the term of this patent is extended or adjusted under 35 U.S.C. 154(b) by 0 days.

(21) Appl. No.: 10/471,735

(22) PCT Filed: Feb. 7, 2002

(86) PCT No.: PCT/EP02/01269

§ 371 (c)(1),
(2), (4) Date: Mar. 30, 2004

(87) PCT Pub. No.: WO02/075353

PCT Pub. Date: Sep. 26, 2002

(65) Prior Publication Data

US 2004/0150547 A1 Aug. 5, 2004

(30) Foreign Application Priority Data

Mar. 15, 2001  (EP) ............................................. 01106289

(51) Int. Cl.$^7$ ............................................... G01S 13/90
(52) U.S. Cl. ................. 342/25 F; 342/25 R; 342/25 C; 342/59; 342/175; 342/195
(58) Field of Search ............................... 342/25 R–25 F, 342/27, 28, 59, 118, 128–146, 25, 89–103, 175, 192–197; 367/88

(56) References Cited

U.S. PATENT DOCUMENTS

| 4,088,978 | A | * | 5/1978 | Gilmour | ........................ | 367/88 |
|---|---|---|---|---|---|---|
| 4,253,098 | A | | 2/1981 | Blythe | | |
| 4,325,065 | A | | 4/1982 | Caputi, Jr. | | |
| 4,462,032 | A | * | 7/1984 | Martin | ........................ | 324/25 |
| 4,727,373 | A | * | 2/1988 | Hoover | ........................ | 342/25 |
| 4,989,008 | A | | 1/1991 | Fujisaka et al. | | |
| 5,059,966 | A | | 10/1991 | Fujisaka et al. | | |
| 5,295,118 | A | * | 3/1994 | Gilmour | ........................ | 367/88 |
| 5,898,399 | A | * | 4/1999 | Carrara et al. | ................ | 342/25 |

OTHER PUBLICATIONS

*IEEE Transactions on Geoscience and Remote Sensing*, 27 (1989) Jul., No. 4, pp. 375–383 by Ronald Kwok et al. entitled Block Adaptive Quantization of Magellan SAR Data.

*IEEE Transactions on Geoscience and Remote Sensing*, 28 (1990) Jan., No. 1, pp. 88–96 by Fuk K. Li et al. entitled Studies of Multibaseline Spaceborne Interferometric Synthetic Aperture Radars.

* cited by examiner

Primary Examiner—Bernarr E. Gregory
(74) Attorney, Agent, or Firm—Crowell & Moring LLP (57) ABSTRACT

A synthetic aperture radar (SAR) processes radar has a transmit aperture and a receive aperture that is of a different size from the transmit aperture. The receive aperture is separated from the transmit aperture and is divided into a number of receive sub-apertures arranged in the elevation and azimuth directions. Circuitry is used to process the received radar signal coherently by phase shifting each receive sub-aperture signal by a time and/or frequency variant phase value and by summing the resulting signals from receive sub-apertures arrayed along the elevation direction, whereby the time and/or frequency variant phase value is generated in such a way that the radar echo signal is maximized in the summed signal as the radar transmit signal runs over the earth's surface.

19 Claims, 6 Drawing Sheets

Microstrip patch radiator

CFRP honeycomb structure for mechancal stiffness

SIDE LOOKING SAR SYSTEM

BACKGROUND AND SUMMARY OF THE INVENTION

The invention relates to a side-looking SAR (synthetic aperture radar) system.

Limitations of a Conventional SAR System

For conventional SAR systems, the coverage in across track direction and geometric resolution in along track direction are contradicting system parameters.

In a conventional monostatic SAR system, the same real aperture of length L and height H is used for transmit and receive. In order to sample the radar echoes of the wanted target area unambiguously, it is shown in J. C. Curlander and R. N. McDonough, *Synthetic Aperture Radar Systems and Signal Processing*, New York: Wiley, 1991, p. 21 ff. that a minimum antenna aperture A is required.

$$A = L \cdot H > \frac{4 \cdot v_s \cdot \lambda \cdot R_s \cdot \tan(\varphi)}{c} \qquad \text{Equ. 1}$$

In Equ. 1, $v_s$ is the speed of the SAR platform, $\lambda$ is the wavelength at center frequency, $R_s$ is the slant range to the target, $\varphi$ is the incidence angle and c is the speed of light. Even though Equ. 1 is based on a number of approximations, it clearly shows the principle limitations of a conventional SAR system. The two top level system parameters swath width $W_{sw}$ and the azimuth resolution $\delta_{az}$ are contradicting and can not be improved at the same time. In order to illuminate a wider swath width, the antenna height H must be decreased. A better azimuth resolution in stripmap mode requires a shorter length L of the antenna ($\delta_{az}=L/2$).

For the case of an airborne SAR, this constraint is not so important because the platform speed $v_s$ and the slant range $R_s$ are orders of magnitude smaller, than in the spaceborne case. The minimum antenna size is a very important consideration in the spaceborne case. Conventional SAR systems use special modes of operation to overcome these constrains. They are called the Spotlight and the ScanSAR mode described in A. Currie, M. A. Brown, Wide-swath SAR, IEE Proceedings-F, Vol. 139, No. 2, April 1992.

The Spotlight mode allows to improve the azimuth resolution by pointing the antenna beam to the spot for a longer aperture. The disadvantage is that by doing so, only single high resolution spots can be imaged, but no continuous coverage is possible.

The ScanSAR mode uses a highly agile antenna beam in order to switch rapidly between a number of N subswath. This results in an improved swath width but at the cost of a N+1 times reduced azimuth resolution.

DE 34 30 749 A1 describes a method of swath widening and data reduction in a SAR system. The method utilizes the fact that the Doppler history for targets from different distance ranges has slight differences. The echos of targets from different distance ranges are received in one single receive channel and transmitted to the ground as just one echo. There, the echos of different distance ranges can be separated due to their individual Doppler histories.

The system described in R. Kwok, W. T. K. Johnson, *Block Adaptive Quantization of Magellan SAR Data*, 1989, IEEE Trans. Geoscience & Remote Sensing, Vol. 27, No. 4, pp. 375–383 has a special mode for improved along track resolution During receive, the aperture is divided in azimuth into two sub-apertures and the signal of each sub-aperture is separately recorded and transmitted to the ground for SAR processing. The same division in azimuth can be used for the detection of moving targets.

The principle of moving target detection is described in detail in P. Meisl, A. Thompson, A. Luscombe, RADARSAT-2 Mission: Overview and Develop-ment Status, Proceedings of EUSAR 2000[1] J. H. G. Ender, Detection and Estimation of Moving Target Signals by Multi-Channel SAR, AEÜ Int. J. Electron Commun. 50(1996) No. 2, 150–156. It requires multiple receive channels and multiple receive antennas or sub-apertures separated in along track direction. Special signal processing algorithms then allow detection of moving targets within the SAR image.

A further technique, using two receive apertures and receive channels, is the SAR interferometry described in Fuk K. Li, R. M. Goldstein, Studies of Multibaseline Spaceborne Interferometric Synthetic Aperture Radars, IEEE Transactions on Geoscience and Remote Sensing, Vol. 28, No. 1, January 1990. There the two receive apertures have to be separated in elevation or cross track direction. The separation required for interferometry is in the order of several tens or even hundreds of meters. Here again, the two signals have to be separately recorded and are combined only after the SAR image processing.

The object of the present invention is to overcome the described constraints of a conventional SAR system. The new SAR system should allow combining a high azimuth resolution with an improved swath width and a continuous lossless coverage in stripmap mode.

According to the invention, the SAR system is a bistatic radar, where the receive antenna is built up from multiple receive sub-apertures in azimuth as well as in elevation direction. A coherent data processing to reduce the data volume is performed on board with the signals from the sub-apertures.

The SAR system for spaceborne application is capable of combining a very high geometric resolution with a very large coverage area. Such a SAR system is, e.g., well suited for large area surveillance and high resolution mapping applications. In particular, the SAR system according to the invention allows combining a very high azimuth resolution with an improved swath width.

A higher coverage in across track as well as a higher geometric resolution in along track direction require both an increased average transmit power in a conventional SAR system. The SAR system according to the invention allows the reduction of the required average transmit power by the use of a receive antenna with higher antenna gain and the optimized design of the separated transmit and receive antennas.

BRIEF DESCRIPTION OF THE DRAWINGS

The invention is described in more detail with reference to the accompanying drawings, of which

DETAILED DESCRIPTION OF THE DRAWINGS

Instrument Architecture

The SAR instrument architecture according to the invention combines a separate transmit aperture with multiple receive apertures in elevation as well as in azimuth. In the following, first the principle of multiple sub-apertures in elevation is explained and then the principle of multiple sub-apertures in azimuth. Then, both principle are combined.

The SAR instrument architecture of this invention has two separated apertures for transmit and receive. The two apertures of the bistatic radar can be either mounted on the same or on two different satellites flying in a constellation. This allows optimization of the electrical design of each antenna and the RF electronics for transmitting or for receiving. The total aperture size can also be traded and varied between transmit and receive.

The size of the transmit aperture determines the target area illuminated with one radar pulse. The transmit aperture size in elevation is inversely proportional to the final image swath width. In order to produce a larger imaged swath width, the size of the transmit aperture in elevation $h_{tx}$ must be smaller than in a conventional SAR system. The azimuth dimension is proportional to the maximum receivable azimuth resolution.

To compensate for the smaller transmit gain, the total receive aperture size in elevation is larger than in a conventional system. It is divided into a number of sub-apertures. Each sub-aperture has to cover the area illuminated by the transmit aperture and, therefore, its elevation size $h_{rx}$ has to be smaller or equal to the elevation size of the transmit aperture. The second requirement limiting the elevation size of the sub-aperture is that when combining the signals of the sub-apertures, the generated quantization lobes of the resulting antenna pattern must be below a certain level. The azimuth size of each receive sub-aperture is the same as in the transmit aperture. To obtain the same radiometric conditions as in a conventional system, the product of the transmit and the total receive aperture size should be the same as the squared conventional aperture size if all other instrument parameters remain the same. (It is expected that due to an optimized design of the separate transmit and the receive path, lower losses as well as a lower noise figure can be achieved. This will in addition improve the efficiency of the SAR instrument and partially compensate for the lower gain.)

The signal from each sub-aperture is received in a separate channel. Each channel provides a separate input for the subsequent digital signal processing.

A. Multiple Receive Sub-Apertures in Elevation

The wide imaging swath and the high resolution in azimuth direction require the use of a small transmit aperture compared to a conventional SAR system design as explained in the last paragraph.

This reduction of transmit aperture size causes a reduced received signal power (determined by the radar equation) compared to a conventional SAR system and so the radiometric resolution in the image is decreased. To improve the radiometric performance, the transmit power and/or the effective receive aperture size can be increased. In the presented invention, the second is realized by building a larger receive aperture in elevation out of multiple receive sub-apertures.

The echo received independently from each sub-aperture is phase shifted by a time and frequency dependent phase function and then coherently combined with the signals from the other receive apertures in the preprocessing. If this preprocessing is realized on board the satellite, the resulting receive data rate is the same as for a radar with one receive channel.

Figure 1:
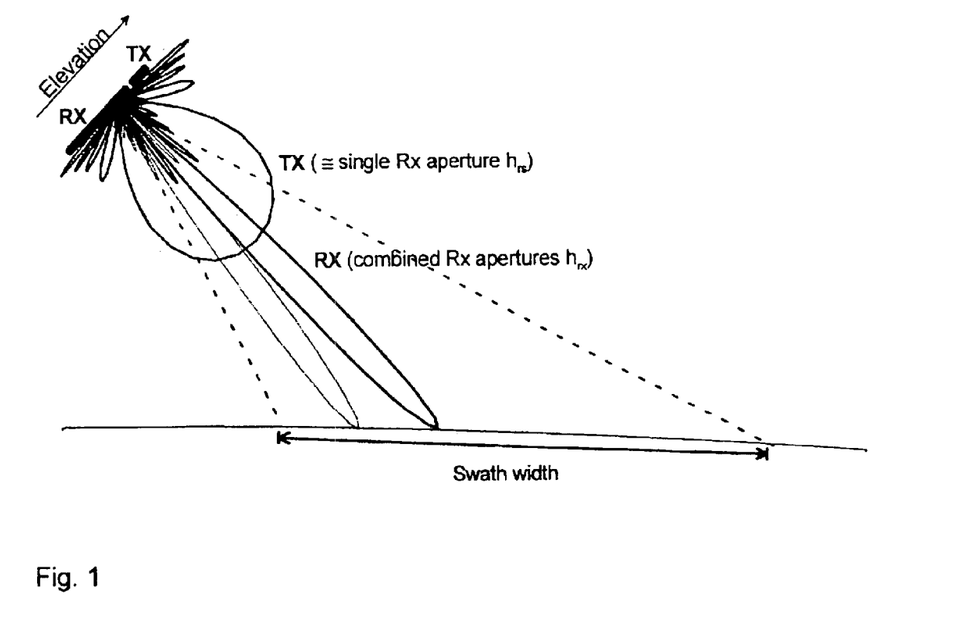
FIG. 1 illustrates the principle of combining multiple apertures in receive.

Effectively the processing of the signals of the multiple receive apertures can be regarded as a multiple beam forming process where the resulting beams are steered between −3 dB points in elevation of the transmit aperture as displayed in FIG. 1.

The steering of the beams during processing can create quantization lobes in the resulting antenna receive pattern. This has to be taken into account when the size in elevation of the receive sub-apertures $h_{rs}$ is selected. In general, the requirement on the receive quantization lobe level can be less stringent than in the case of an active phased array antenna because the quantization lobes only appear in the receive pattern and the independent transmit pattern can provide a large portion of the alias signal suppression. In order to keep the things simple for the explanation of the principles, only unweighted antenna apertures are investigated in the following. The introduction of an antenna taper gives additional freedom for optimization.

Figure 2:
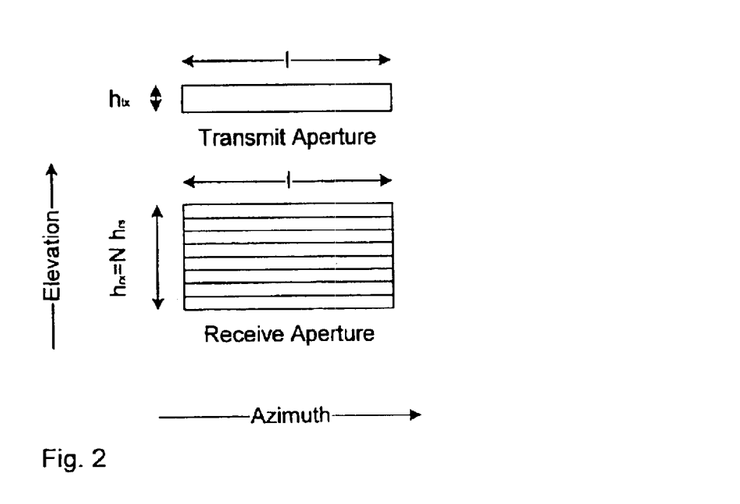
FIG. 2 shows multiple receive apertures in elevation.

The parameters to describe the multiple receive apertures in elevation configuration shown in FIG. 2 are listed in Tab. 1.

As previously described, the elevation dimension of the receive sub-aperture $h_{rs}$ relative to the elevation dimension of the transmit aperture $h_{tx}$ is constrained by the highest specified grating lobe level.

From the radar equation it is known that the signal-to-noise ration (SNR) for one of the observed target points is proportional to the product of transmit and receive gain which is again proportional to the product of transmit and receive aperture area. To be able to compare the multiple receive aperture configuration with the standard monostatic single transmit/receive aperture concept, the effective antenna aperture can be calculated.

$$SNR \sim G^2 \sim A^2 = A_{tx} \cdot A_{rx} = lh_{tx} \cdot lh_{rx} = l^2 \cdot h_{tx}^2 \cdot a \cdot N \Rightarrow \qquad \text{Equ. 2}$$

$$l \cdot h_{tx} = \frac{A}{\sqrt{a \cdot N}} \qquad \text{Equ. 3}$$

The total antenna aperture (transmit+receive) $A_{bi}$ of a bistatic configuration which is necessary to maintain the same SNR for a point target when the other instrument parameters are unchanged is calculated as follows. The parameter $A = l \cdot h$ is the corresponding antenna surface in a monostatic configuration which provides the same SNR (but a smaller swath width).

$$A_{bi} = l \cdot h_{tx} + l \cdot h_{rx} = l \cdot h_{sx} + l \cdot h_{rs} \cdot N \quad \text{where: } N > 1; N \in \mathbb{N} \qquad \text{Equ. 4}$$

$$= l \cdot h_{tx} + l \cdot h_{sx} \cdot a \cdot N$$

$$= l \cdot h_{tx} \cdot (1 + a \cdot N)$$

When inserting Equ. 2 the following is obtained.

$$A_{bi} = \frac{A}{\sqrt{a \cdot N}} \cdot (1 + a \cdot N) = A \cdot \left( \frac{1}{\sqrt{a \cdot N}} + \sqrt{a \cdot N} \right) \qquad \text{Equ. 5}$$

-continued $$A_{tx} = A \cdot \frac{1}{\sqrt{a \cdot N}}$$

$$A_{rx} = A \cdot \sqrt{a \cdot N}$$

In this simplified model it can be assumed that the imaged swath width in ground range direction is proportional to the antenna beam width in elevation. This means that the swath width, which can be imaged, is inversely proportional to the transmit aperture dimension in elevation $h_{tx}$.

From Equ. 5 it can be seen how the transmit aperture height $h_{tx}$, the receive aperture height $h_{rx}$ and from this also th imaged swath width are related as a function of N when taking the monostatic antenna height h and the corresponding swath width as the reference.

$$h_{tx} = h \cdot \frac{1}{\sqrt{a \cdot N}} \quad \text{Equ. 6}$$

$$h_{rx} = h \cdot \sqrt{a \cdot N}$$

$$\frac{1}{h_{tx}} = \frac{1}{h} \cdot \sqrt{a \cdot N}$$

The swath width to be imaged is increased by a factor of $$\frac{h}{h_{tx}} = \sqrt{a \cdot N}$$

when the transmit aperture dimension in elevation $h_{tx}$ is decreased, which is proportional to the increase of the receive aperture height $h_{rx}$.

This leads to the conclusion that different to the monostatic SAR systems in the proposed bistatic SAR system concept, the imaged swath width is increased proportionally to the receive aperture height $h_{rx}$ without decreasing the radiometric and geometric resolution.

B. Limitations of the Swatch Width due to Ambiguities in Range

One factor which limits the maximum achievable swath width in range are the range ambiguities. Ambiguities in range occur when the antenna receives at the same time echos which are generated from subsequent pulses and which therefore cannot be distinguished. This can happen in the spaceborne case where always a number of subsequent pulses are in the 'air' at the same time. The distance between these pulses can be increased by reducing the Pulse Repetition Frequency (PRF). But there is a lower limit for the PRF because the azimuth spectrum has to be sampled correctly. A good rule of thumb is that the next pulse is sent at the latest when the satellite has moved forward by ½ of the antenna azimuth length 1. With this the minimum PRF is defined in Equ. 7.

$$PRF_{min} = \frac{2v_s}{l} \quad \text{Equ. 7}$$

The worse case, that is the minimum achievable swath width $w_{sw}$ for a certain PRF, can be found at the maximum incidence angle $\phi_i$ as can be seen in Equ. 8. The incidence angle $\phi_i$ is defined as the angle between the local normal vector on the earth surface and the direction from where the wave is approaching. Further, it is assumed that only a maximum of 80% of the time intervals between the pulses can be used for receiving the echoes. The remaining time is reserved for the transmit pulse and some guard time. The speed of light is denoted as $c_0$.

$$w_{sw} = 0.8 \frac{c_0}{2 \cdot PRF \cdot \sin\phi_i} \quad \text{Equ. 8}$$

$$= 0.8 \frac{l \cdot c_0}{4 \cdot v_s \cdot \sin\phi_i}$$

Equ. 8 is an approximation as it assumes a constant incidence angle over the whole swath width.

C. Multiple Receive Sub-Apertures in Azimuth

Figure 3:
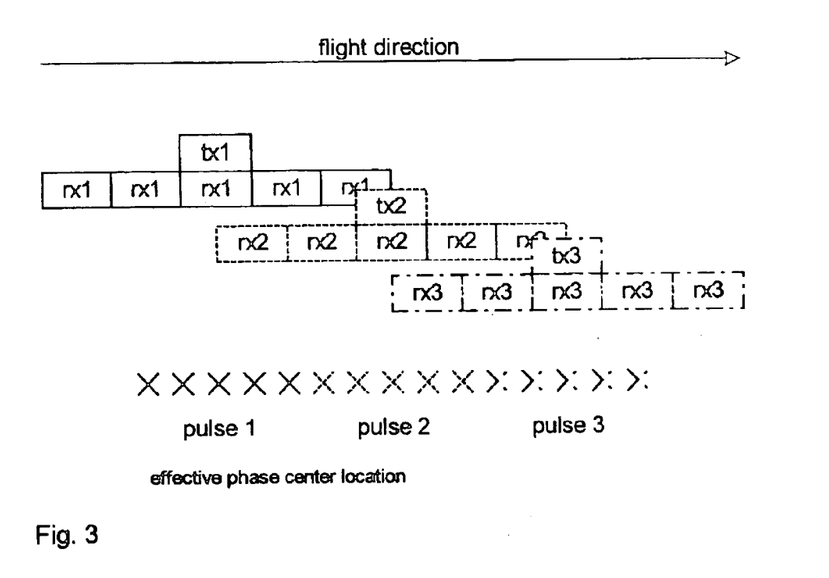
FIG. 3 shows the effective phase center location when using multiple receive apertures in azimuth.

This conflict between the high azimuth resolution and the large swath width can be solved with a configuration, where multiple (e.g. M) receive apertures are placed in azimuth direction. This arrangement enables correct sampling of the azimuth spectrum with a PRF fitting the total antenna azimuth dimension, which is M times smaller than the PRF necessary for the sub-aperture size 1. This is possible because with every pulse the echo is sampled at M different positions. As the effective phase center is located in the middle between the transmit and the receive aperture the maximum azimuth sample spacing of ½ is fulfilled. This displaced phase center system operation [2] is demonstrated in FIG. 3.

In order to fulfill the radiometric requirements each receive aperture must have the aperture size as derived in paragraph 2.1.

The echo received in each sub-aperture must be stored separately.

Figure 4:
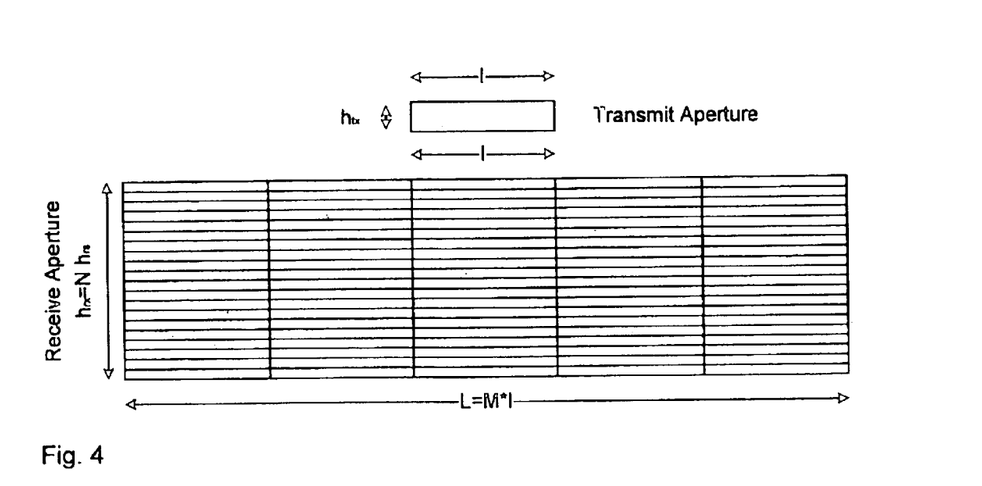
FIG. 4 shows multiple receive apertures in azimuth and elevation.

The concept of multiple receive sub-apertures in elevation and multiple sub-apertures in azimuth can be combined. Such a configuration is shown in FIG. 4.

The configuration with multiple receive apertures in elevation and in azimuth can be characterized with the set of five parameters shown in Tab. 2.

The receive aperture has the dimension L=M·1 in azimuth and $h_{rx} = N \cdot h_{rs}$ in elevation.

D. Selection of the Region of Interest

The steering to the region of interest can be realized by a roll of the satellite. It is assumed that the swath width in strip map mode, which is larger than with a conventional SAR system, is sufficient and so no extra ScanSAR mode is needed for wide swath application. Due to the mechanical pointing, the selection of a new swath at a different range position needs more time than with a SAR system, which is equipped with an active phased array antenna.

On-Board Signal Processing

The presented invention requires to have multiple receive sub-apertures which provide one receive signal each. This would increase the amount of data, which has to be stored on board and then transmitted to the ground by (N·M) the number of receive sub-apertures. This is especially critical for a high resolution wide swath radar system, which in any case requires to handle a large data volume. In the processing of the SAR data to an image, the different receive signals have to be combined. It is suggested that at least this part of the processing is done on board in order to reduce the data volume.

The invention foresees multiple receive sub-apertures in elevation as well as in azimuth. The multiple receive sub-apertures in azimuth are used to reduce the required PRF. Due to this, the multiple of receive apertures in azimuth do not increase the effective data rate and there is no data reduction possible.

This is different from the multiple receive sub-apertures in elevation located in one column. It is possible to combine the signals from different receive sub-apertures within a column into one signal that contains all necessary information. In principle, it is done by a time variant phase shift of each signal followed by the summation of the echo signals. This phase shift can be realized digitally e.g. by a time variant phase multiplication. The time variant phase shift is performed in a way that the radar echo signal is maximized in the summed signal as the radar signal runs over the earth's surface.

After this summation of the N signals from the N sub-apertures in the column, only the M signals from the M columns have to be stored on board and then transmitted to the ground. This corresponds to a data reduction by a factor N.

For radar systems, which use a chirped signal instead of a short pulse, the correct time variant phase shift varies with frequency because of the longer duration of the transmit pulse and the linear time connection between time and frequency in a linear chirp. This means that additionally to the time variant phase shift a time invariant but frequency dependent phase shift is required. Again the objective of this adaptive time-frequency variant processing is to maximize radar echo signal power in the resulting signal. The frequency variant phase shift can be realized, for example, with a specially designed allpass filter or by a phase multiplication after transformation in the frequency domain.

Figure 5:
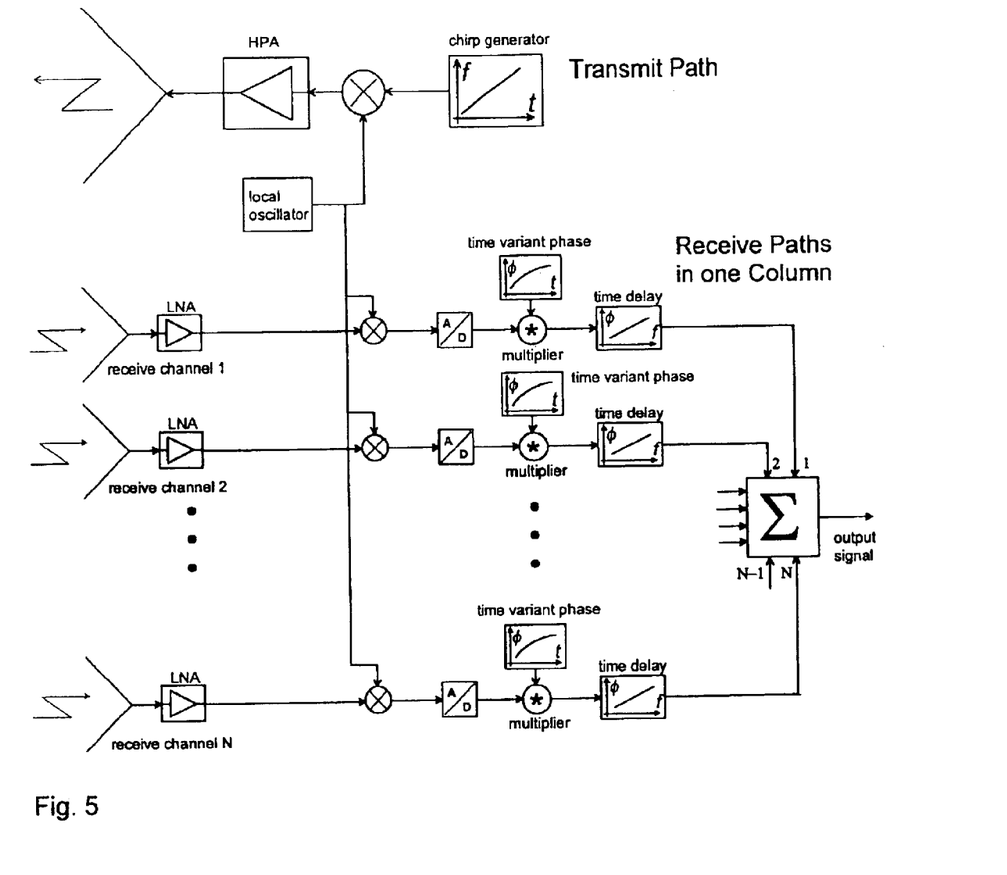
FIG. 5 is a block diagram showing the combination of signals from different receive apertures in elevation.

The block diagram in FIG. 5 shows the signal processing operations and the signal combination from the different receive sub-apertures in elevation. The processing of the signals is best implemented digitally following an analog to digital conversion of the signal from each sub-aperture so that no beam-forming network in elevation is required.

The described signal processing could be implemented with an algorithm containing the following steps:

Implementation of a time variant phase shift by multiplication of an adapted time variant phase value to the signal of each sub-aperture according to the time variant echo direction and the sub-aperture's position in the receive aperture.

Correction of this time variant phase shift for the different times in the transmit pulse by introduction of an adapted frequency dependent phase shift to each echo signal. This frequency variant phase shift is adapted to the radar geometry and the position in the receive sub-aperture. One way of realization is to design the transfer function of an allpass filter accordingly.

Coherent summation of the signals from the sub-apertures in one column into one single signal with maximized processing gain for the relevant echo signal.

Optionally, the resulting signal can be compressed using a BAQ like algorithm (BAQ Method of Block Adaptive Quantization [2]).

With this signal, a conventional SAR image processing has to be performed in order to form SAR images from the raw data.

A. Derivation of the Time Variant Phase Shift

Figure 6:
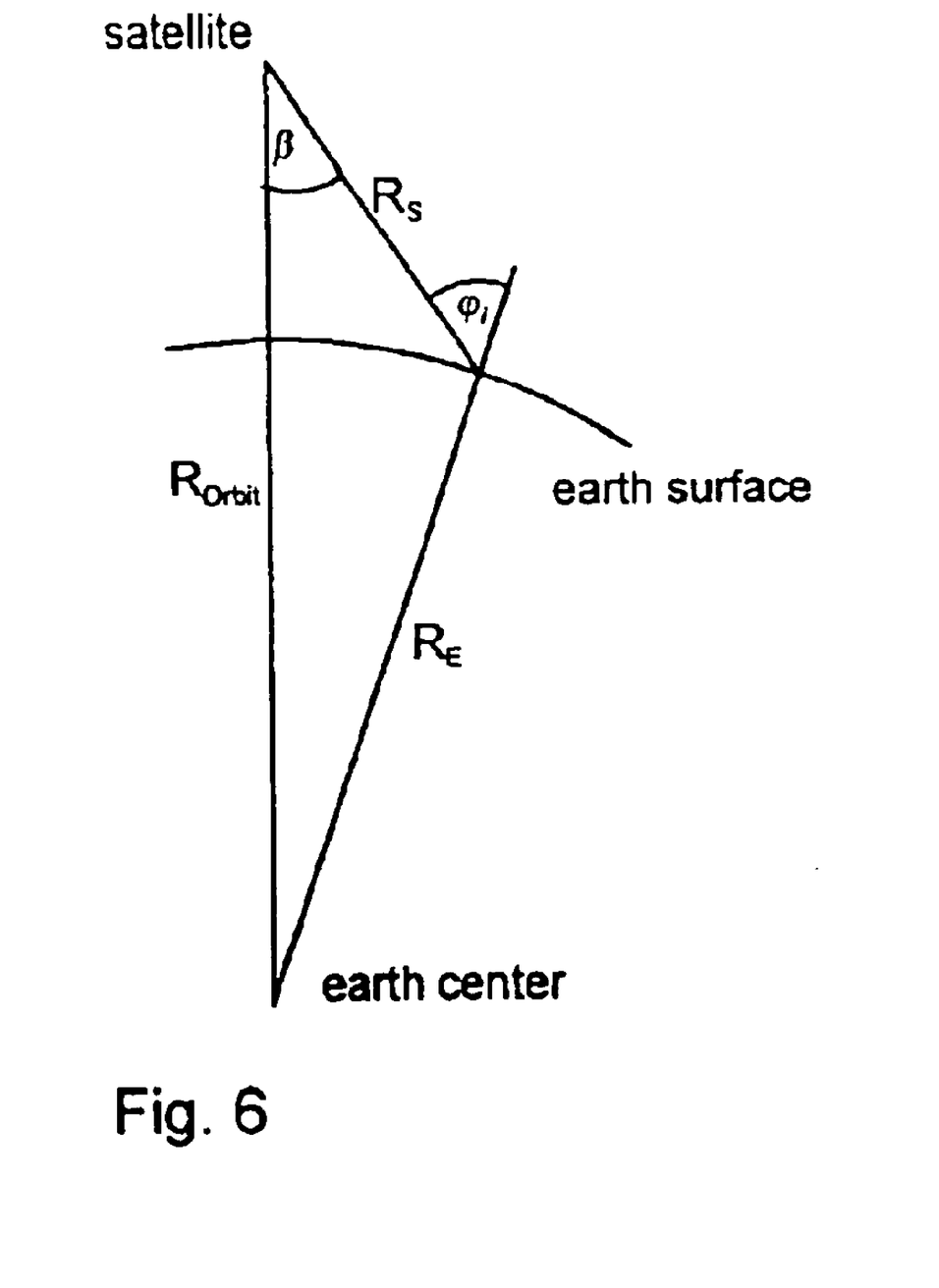
FIG. 6 illustrates the definition of angles and radii in a round earth geometry.

A locally round earth with a local earth radius $R_E$, as shown in FIG. 6, is assumed. The other parameters are the orbit radius $R_{Orbit}$, the incidence angle at bore sight of the antenna $\phi_i$, the −3 dB width of the transmit antenna $\theta_{tx}$, the wavelength at center frequency $\lambda$ and the distance of the phase centers of the sub-apertures in elevation corresponding to their height h.

First, the situation for a short pulse SAR system is examined. The receive signal timing is characterized by the swath center echo time $t_{echo}$ and the data window length $t_{data}$.

The off nadir angle $\beta$ for a given incidence angle $\phi_i$ is given by the following equation.

$$\beta = \arcsin\left(\frac{R_E \sin\varphi_i}{R_{Orbit}}\right) \quad \text{Equ. 9}$$

The bore sight of the antenna points in the direction of the off nadir angle $\beta$. The limits of the imaged swath in terms of the off nadir angle are defined by the 3 dB width $\theta t_x$ of the transmit antenna. The off nadir angle for the near range swath edge is $\beta_n=\beta-\theta_{tx}/2$ and $\beta_f=\beta+\theta_{tx}/2$ for the far range swath edge.

$$R_S = R_{Orbit} \cdot \cos(\beta) - \sqrt{R_{Orbit}^2 \cdot (\cos^2(\beta)-1) + R_E^2} \quad \text{Equ. 10}$$

The slant range $R_s$ can be converted into an echo time by dividing with the half of the speed of light $t=2R_s/c_0$. Combining this, the near range time $t_n$ and the far range time $t_f$ are defined by the following equations.

$$t_n = 2 \cdot \frac{R_{Orbit} \cdot \cos\left(\beta - \frac{\theta_{tx}}{2}\right) - \sqrt{R_{Orbit}^2 \cdot \left(\cos^2\left(\beta - \frac{\theta_{tx}}{2}\right) - 1\right) + R_E^2}}{c_0} \quad \text{Equ. 11}$$

$$t_f = 2 \cdot \frac{R_{Orbit} \cdot \cos\left(\beta + \frac{\theta_{tx}}{2}\right) - \sqrt{R_{Orbit}^2 \cdot \left(\cos^2\left(\beta + \frac{\theta_{tx}}{2}\right) - 1\right) + R_E^2}}{c_0}$$

The echo window time, which has to be sampled is simply given by the difference $t_{echo}=t_f-t_n$. The swath center echo time is given by $t_{center}=(t_f+t_n)/2$.

In the next step, the angle $\theta$ in which the resulting receive pattern has to be steered away from the antenna bore sight must be determined as a function of echo time. For this Equ. 12 has to be inverted.

$$t(\theta) = 2 \cdot \frac{R_{Orbit} \cdot \cos(\beta + \theta) - \sqrt{R_{Orbit}^2 \cdot (\cos^2(\beta + \theta) - 1) + R_E^2}}{c_0} \quad \text{Equ. 12}$$

The inversion is given in Equ. 13.

$$\theta(t) = \operatorname{acos}\left(\frac{4 \cdot R_{Orbit}^2 - 4 \cdot R_E^2 + t^2 c_0^2}{4 \cdot R_{Orbit} \cdot t \cdot c_0}\right) - \beta \quad \text{Equ. 13}$$

Figure 7:
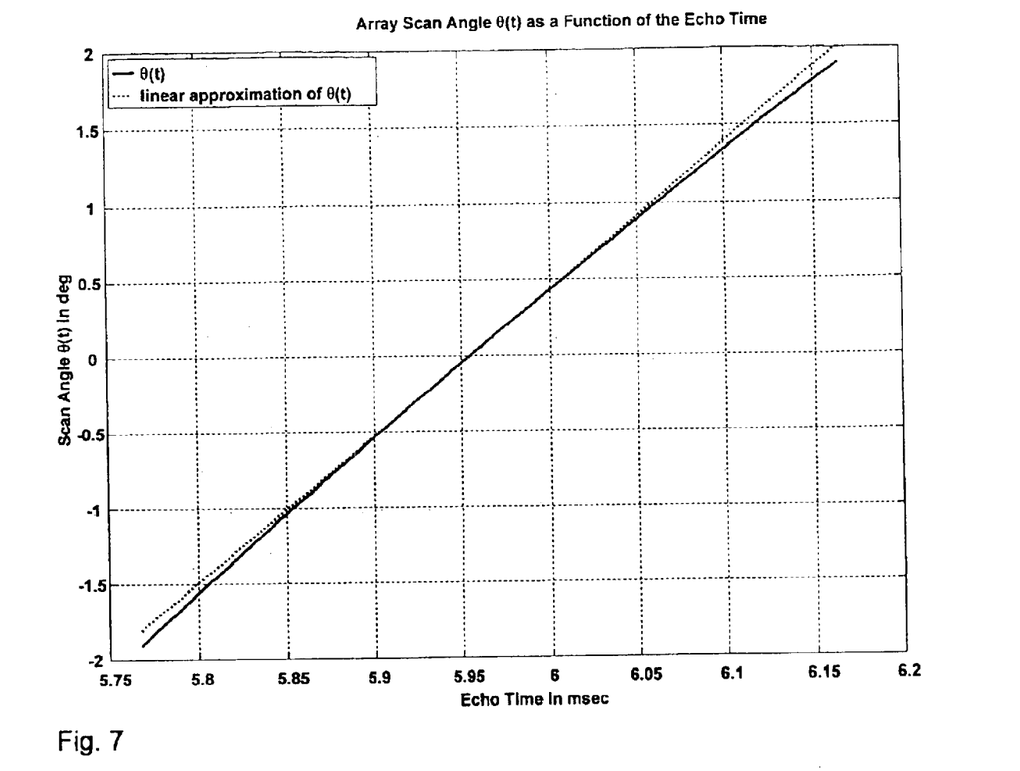
FIG. 7 is a diagram depicting the array scan angle as a function of the echo time.

The angle $\theta$ as a function of the echo time is displayed in FIG. 7 using a set of realistic parameters: $\phi_i=45°$, $\theta_{tx}=3.8°$ (corresponds to 0.1 m $t_x$ antenna height), $R_{orbit}=7038$ km, $R_E=6378$ km. Here, the relation between the echo time and the array scan angle resembles a linear function. For wider swath and larger $\theta_{tx}$, the non linearity due to the earth curvature becomes more visible.

In order to find a linear approximation of the time variant scan angle $\theta(t)$, Equ. 13 is differentiated with respect to the time $\delta\theta(t)/\delta t$ and the expression is evaluated at the swath center time $t_c$.

$$\frac{\partial}{\partial t}\theta(t_c) = \qquad \text{Equ. 14}$$

$$\frac{R_{Orbit}\cos(\beta)\sqrt{R_{Orbit}^2\cos^2(\beta) - R_{Orbit}^2 + R_E^2} - R_{Orbit}^2 + R_E^2)}{R_{Orbit}^2\sin(\beta)(2R_{Orbit}^2\cos^2(\beta) - }$$

$$2R_{Orbit}\cos(\beta)\sqrt{R_{Orbit}^2\cos^2(\beta) - R_{Orbit}^2 + R_E^2} - R_{Orbit}^2 + R_E^2\big)$$

$$t_c = 2 \cdot \frac{R_{Orbit}\cdot\cos(\beta) - \sqrt{R_{Orbit}^2\cdot(\cos^2(\beta)-1) + R_E^2}}{c_0} \qquad \text{Equ. 15}$$

In FIG. 7, the function $\theta(t)$ from Equ. 13 and the linear approximation are shown.

1) Scan Angle of the Different Receive Sub-Apertures

In the next step the scan angle of the receive aperture must be converted into a phase shift in the individual signals coming from the sub-arrays. This analysis is done the same way as for an electronically scanned array. Instead of realizing the phase shift in analog in the RF band, it is realized digitally in the complex equivalent basis band.

The phase center position is assumed to be located in the center of the sub-arrays and $d_n$ is the directed distance of the $n^{th}$ sub-arrays phase center from the center of the receive aperture, which is positive if located above the center of the aperture. Together with the radar wavelength $\lambda$, the actual phase shift $\gamma_n$ to be implemented for the signal of each sub-aperture as a function of the steer angle $\theta$ can be calculated with Equ. 16.

$$\gamma_n(t) = d_n \cdot \sin(\theta(t)) \cdot 2\pi/\lambda \qquad \text{Equ. 16}$$

B. Derivation of the Time-Frequency Variant Phase Shift for a Chirped SAR System The time variant phase shift, which was given in section A above, has to be extended by a frequency dependent phase shift when a frequency modulated transmit signal is used instead of short pulse to obtain the required range resolution. The SAR system operating with a linear chirp is described additionally to the already given parameters with its pulse length $\tau_p$, SAR signal bandwidth B, the chirp rate $\kappa = B/\tau_p$ and the sampling frequency $f_s$ of the A/D converter. In a chirped system the echo coming from the imaged swath is extended by the pulse length. Therefore, in this case, the echo window is given by $t_{echo} = t_f - t_n + \tau p$.

For the short pulse system the resulting receive beam pattern can always be pointed to the direction from which the echo originates. In the case of a long pulse this is only possible for one position in the pulse. The rest of the pulse does not receive the full receive gain of the antenna. This can be compensated when additionally a frequency dependent beam steering is added. After the phase multiplication in the time domain, which follows the center of the pulse, a second phase multiplication in the spectral domain which implements to proper beam steering for every section within the pulse. This is possible because of the direct connection between the time and the frequency present in the linear chirp signal.

The following steps are necessary to combine the echo signals from the different sub-apertures in the chirped signal case:

Multiplication of the time signal with a time variant phase function $\gamma_n(t)$ for every sub-aperture to realize the aperture steer angle $\theta_{ch}(t)$. The difference to the steer angle of the short pulse system shown in Equ. 13 is that the steer angle is calculated for the middle of the pulse which corresponds to the center frequency of the chip. The steer angle of the chirped system $\theta_{ch}(t)$ shown in Equ. is therefore given by a $\tau_p/2$ delayed version of $\theta(t)$.

$$\theta_{ch}(t) = \theta\left(t - \frac{\tau_p}{2}\right) = \mathrm{acos}\left(\frac{4\cdot R_{Orbit}^2 - 4\cdot R_E^2 + \left(t - \frac{\tau_p}{2}\right)^2 c_0^2}{4\cdot R_{Orbit}\cdot\left(t - \frac{\tau_p}{2}\right)\cdot c_0}\right) - \beta \qquad \text{Equ. 17}$$

Realizing a scan angle $\theta_f(f)$ for the frequencies $-B/2 \leq f \leq B/2$ to compensate the spread of the signal over time of the chirp.

$$\theta_f(f) = \frac{\partial}{\partial t}\theta(t_c)\cdot\frac{\tau_p}{B}\cdot f = \frac{\partial}{\partial t}\theta(t_c)\cdot\frac{f}{\kappa} \qquad \text{Equ. 18}$$

The steering angles $\theta_{ch}(t)$ and $\theta_f(f)$ are converted into phase values for multiplication of signal or the spectrum of the signal of each sub-aperture with the help of Equ. 16. The modification of spectrum with a linear phase can be realized with a time delay of the signal adapted for each sub-aperture. The parts of the time delay corresponding to full sampling periods can be realized by storing the data for a number of clock cycles. The parts of the time delay corresponding to fractions of a sampling period can be realized by an interpolation of the data. One way to realize this interpolation digitally is by using an interpolation filter. The sub-sampling period delay can be also realized by a shift of the clock signal for the analog to digital converter.

Possible Technological Implementation

A. Technologies for Receive Aperture

The total receive aperture can become a relatively large structure, which must be storable for the launch and then deployment in space. For this purpose it is important that the structure is rigid, light weight and possibly thin. The electrical requirements are a high bandwidth and a low electric loss in front of the low noise amplifier to keep the total system losses and the system noise figure low and the cost for production shall be low.

A microstrip patch radiator has a very good potential to fulfill these requirements. Behind a certain number of patches a low noise amplifier amplifies the signal transmission to the central RF electronic. The electric power consumption of a receive path is relatively low so that a temperature stabilization of the LNA can be considered to encounter phase variation. The number of LNAs per sub-aperture is determined by the tolerable losses in front of the LNA to meet the required noise figure and by the required output power of one sub-aperture.

Figure 8:
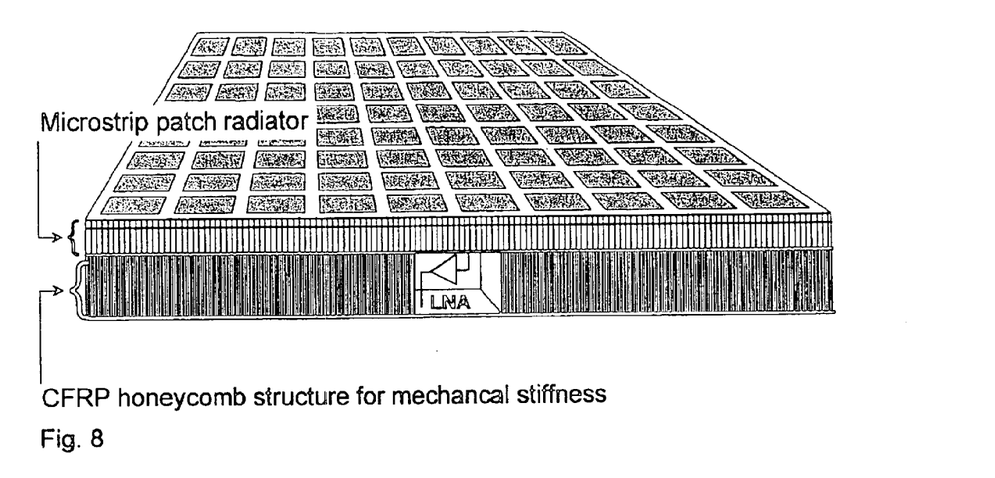
FIG. 8 shows an embodiment of a receive aperture.

The radiator could be mounted on a honeycomb carbon-fiber sandwich, which provides the necessary mechanical support (see FIG. 8). In a first estimate the described structure in X-band would weight about 8 kg/m² and is less then 30 mm thick.

B. Technologies for Transmit Aperture

Compared to the receive aperture, the transmit aperture is relatively small. The main emphasis is to radiate the generated RF energy with as low losses as possible. For the generation of the RF energy Traveling Wave Tubes (TWT) could be used as well as Medium Power Modules (MPM).

Figure 9:
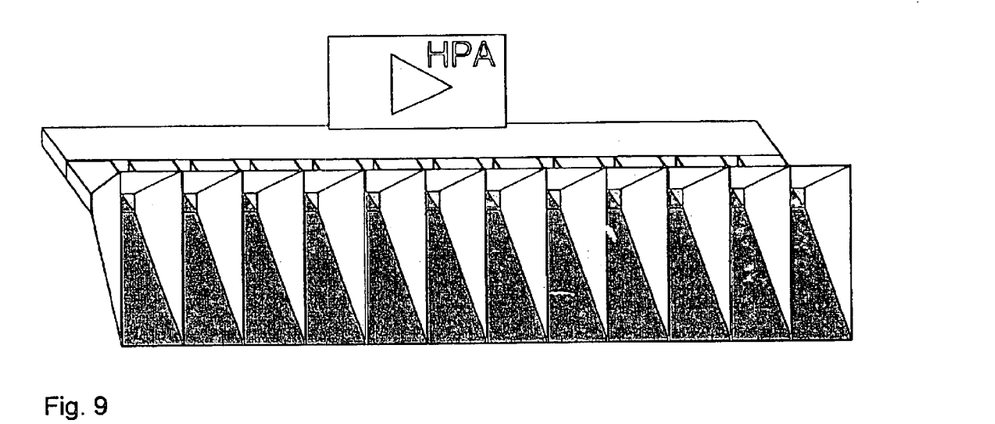
FIG. 9 shows an embodiment of a transmit aperture with transmissions via a stacked horn array.

Depending on the system layout, the sub-apertures are much longer in azimuth direction then in elevation. This requires a specialized reflector design with possibly multiple feeds. An alternative would be to radiate directly from multiple horns. Together with a larger number of MPMs they could be stacked to built up the transmit aperture (see FIG.

9). A large enough number of these units could provide graceful degradation as a redundancy concept.

REFERENCES

1) J. C. Curlander and R. N. McDonough, *Synthetic Aperture Radar Systems and Signal Processing*, New York: Wiley, 1991, p. 21 ff.
2) A. Currie, M. A. Brown, Wide-swath SAR, IEE Proceedings-F, Vol. 139, No. 2, April 1992
3). R. Kwok, W. T. K Johnson, *Block Adaptive Quantization of Magellan SAR Data*, 1989, IEEE Trans. Geoscience & Remote Sensing, Vol. 27, No. 4, pp. 375–383
4) P. Meisl, A. Thompson, A. Luscombe, RADARSAT-2 Mission: Overview and Develop-ment Status, Proceedings of EUSAR 2000[2] J. H. G. Ender, Detection and Estimation of Moving Target Signals by Multi-Channel SAR, AEÜ Int. J. Electron Commun. 50(1996) No. 2, 150–156
5) Fuk K. Li, R. M. Goldstein, Studies of Multibaseline Spaceborne Interferometric Synthetic Aperture Radars, IEEE Transactions on Geoscience and Remote Sensing, Vol. 28, No. 1, January 1990

Tables

TABLE 1

Parameters describing the multiple receive apertures in elevation configuration

| Parameter Description | Unit | |
|---|---|---|
| Azimuth dimension of one sub-aperture | [m] | l |
| Elevation dimension of the transmit aperture | [m] | $h_{tx}$ |
| Elevation dimension of one receive sub-aperture | [m] | $h_{rs}$ |
| Number of sub-apertures attached in elevation in the receive aperture | | N |
| Elevation dimension of the total receive aperture | [m] | $h_{rx} = N\, h_{rs}$ |

TABLE 2

Parameters characterizing a receive aperture with multiple sub-apertures in elevation and in azimuth

| Parameter Description | Unit | |
|---|---|---|
| Azimuth dimension of one sub-aperture | [m] | l |
| Elevation dimension of the transmit aperture | [m] | $h_{tx}$ |
| Elevation dimension of one receive sub-aperture | [m] | $h_{rs}$ |
| Number of sub-apertures attached in elevation in the receive aperture | | N |
| Elevation dimension of the total receive aperture | [m] | $h_{rx} = N \cdot h_{rs}$ |
| Number of sub-apertures attached in azimuth in the receive aperture | | M |
| Azimuth dimension of the total receive aperture | [m] | $M - 1$ |

What is claimed is:

1. Side-looking SAR system, comprising
   a transmit aperture,
   a receive aperture of different size, separated from said transmit aperture and divided into a number of receive sub-apertures arranged along elevation and azimuth directions,
   means for coherently processing signals of each receive sub-aperture, comprising:
   a) means for phase shifting a signal from each receive sub-aperture by at least one of a time and frequency variant phase value,
   b) means for summing the resulting signals from receive sub-apertures arrayed along the elevation direction, and
   c) whereby at least one of the time and frequency variant phase value is generated by the phase shifting means such that the radar echo signal is maximized in the summed signal as the radar transmit signal runs over the earth's surface.

2. Side-looking SAR system according to claim 1, wherein the transmit aperture and receive aperture are mounted on the same or on two different satellites flying in constellation.

3. Side-looking SAR system according to claim 2, wherein for a chirped SAR radar transmit signal, the means for phase shifting the signal from each receive sub-aperture comprises:
   a) means for multiplication of a time variant phase value to the signal of each receive sub-aperture; and
   b) means for imposing a frequency variant phase value on the resulting signal in order to take into account the variant dependence between time, frequency and direction in case of a SAR radar using a chirped transmit signal.

4. Side-looking SAR-System according to claim 3, wherein said means for imposing a frequency variant phase value comprise means for imposing time delays of rational multiples of the sampling period on the resulting signal from each receive sub-aperture.

5. Side-looking SAR-System according to claim 4, wherein said means for imposing time delays comprise:
   a) means for controlled shifting of the clock signal of the analogue to digital converter, and
   b) means of delaying signal samples by a number of full sampling periods.

6. Side-looking SAR system according to claim 2, further comprising means for data compression of the summed signals of different sub-apertures by using a BAQ like algorithm.

7. Side-looking SAR system according to claim 2, wherein the transmit aperture is not divided into any sub-apertures.

8. Side-looking SAR system according to claim 1, wherein for a chirped SAR radar transmit signal, the means for phase shifting the signal from each receive sub-aperture comprises:
   a) means for multiplication of a time variant phase value to the signal of each receive sub-aperture; and
   b) means for imposing a frequency variant phase value on the resulting signal in order to take into account the variant dependence between time, frequency and direction in case of a SAR radar using a chirped transmit signal.

9. Side-looking SAR-System according to claim 8, wherein said means for imposing a frequency variant phase value comprise means for imposing time delays of rational multiples of the sampling period on the resulting signal from each receive sub-aperture.

10. Side-looking SAR-System according to claim 9, wherein said means for imposing time delays comprise:
    a) means for controlled shifting of the clock signal of the analogue to digital converter, and
    b) means of delaying signal samples by a number of full sampling periods.

11. Side-looking SAR system according to claim 10, further comprising means for data compression of the summed signals of different sub-apertures by using a BAQ like algorithm.

12. Side-looking SAR system according to claim 10, wherein the transmit aperture is not divided into any sub-apertures.

13. Side-looking SAR system according to claim 9, further comprising means for data compression of the summed signals of different sub-apertures by using a BAQ like algorithm.

14. Side-looking SAR system according to claim 9, wherein the transmit aperture is not divided into any sub-apertures.

15. Side-looking SAR system according to claim 8, further comprising means for data compression of the summed signals of different sub-apertures by using a BAQ like algorithm.

16. Side-looking SAR system according to claim 8, wherein the transmit aperture is not divided into any sub-apertures.

17. Side-looking SAR system according to claim 1, further comprising means for data compression of the summed signals of different sub-apertures by using a BAQ like algorithm.

18. Side-looking SAR system according to claim 17, wherein the transmit aperture is not divided into any sub-apertures.

19. Side-looking SAR system according to claim 1, wherein the transmit aperture is not divided into any sub-apertures.

* * * * *